United States Patent [19]

White

[11] Patent Number: 5,722,850

[45] Date of Patent: Mar. 3, 1998

[54] TELECOMMUNICATIONS CONNECTORS

[75] Inventor: Rowland Spencer White, Lunenburg, Mass.

[73] Assignee: Molex Incorporated, Lisle, Ill.

[21] Appl. No.: 563,147

[22] Filed: Nov. 27, 1995

[51] Int. Cl.⁶ ................................................. H01R 4/24
[52] U.S. Cl. .............................................. 439/404; 439/709
[58] Field of Search .............................. 439/404, 405, 439/709, 912, 922

[56] References Cited

U.S. PATENT DOCUMENTS

| | | | |
|---|---|---|---|
| 3,798,587 | 3/1974 | Ellis, Jr. et al. | 339/97 |
| 4,171,857 | 10/1979 | Forberg et al. | 339/97 |
| 4,688,865 | 8/1987 | Kelly | 439/922 |
| 4,741,711 | 5/1988 | Singer, Jr. | 439/922 |
| 4,813,880 | 3/1989 | Kramer | 439/65 |
| 4,871,330 | 10/1989 | Muller et al. | 439/922 |
| 5,033,974 | 7/1991 | Biederstedt et al. | 439/265 |
| 5,033,981 | 7/1991 | Scholtholt et al. | 439/716 |
| 5,044,979 | 9/1991 | Siemon et al. | 439/404 |
| 5,160,273 | 11/1992 | Carney | 439/108 |
| 5,163,855 | 11/1992 | Gerke et al. | 439/709 |
| 5,205,762 | 4/1993 | Carney | 439/607 |
| 5,297,970 | 3/1994 | Carney | 439/922 |
| 5,459,643 | 10/1995 | Siemon et al. | 361/785 |
| 5,476,388 | 12/1995 | Rutkowski | 439/404 |
| 5,494,461 | 2/1996 | Bippus et al. | 439/709 |
| 5,522,733 | 6/1996 | White et al. | 439/404 |
| 5,549,489 | 8/1996 | Baggett et al. | 439/709 |
| 5,561,898 | 10/1996 | White et al. | 29/748 |
| 5,575,689 | 11/1996 | Baggett et al. | 439/709 |
| 5,622,516 | 4/1997 | Baggett et al. | 439/922 |

*Primary Examiner*—Gary F. Paumen
*Attorney, Agent, or Firm*—A. A. Tirva

[57] ABSTRACT

A telecommunications connector with break/test facility includes a housing (10) which receives a plurality of pairs of contacts (42,44). The housing has a series of first chambers (40) and a series of adjacent second chambers (56). The first contact of each pair has and insulation displacement portion (102,104) received in the first chamber and a spring tail (114) which is received an anchored in the second chamber. The second contact has a conductor termination portion (80) which may be an insulation displacement contact also arranged in the first chamber beneath the first contact, and a spring contact portion (94) arranged in the second chamber to form a spring contact switch with the spring tail of the first contact. A tester (100) may be inserted into the spring contact switch to test the circuits.

31 Claims, 10 Drawing Sheets

TELECOMMUNICATIONS CONNECTORS

FIELD OF THE INVENTION

This invention relates to telecomunications connectors and in particular to connectors known as break/test connectors which allow access to a connected line circuit for testing or other purposes without disconnecting the line.

BACKGROUND OF THE INVENTION

Break/test connectors are well known and well documented in the art and offered for sale by a number of manufacturers. One example is that made and sold under the trade mark LSA PLUS by Krone AG of Berlin, Germany, and first described in U.S. Pat. No. 4,171,857. Modifications and developments to this basic disclosure are described in U.S. Pat. No. 5,044,979, U.S. Pat. No. 5,160,273 and U.S. Pat. No. 5,205,762. The break test connectors in these prior specifications have a pair of wire termination connectors such as insulation displacement connectors which are separated by an intermediate connector which may be interrupted by insertion of a test circuit, or, where a subscriber circuit is to be cut off at an exchange, by insertion of a plastic blank.

Insulation displacement connectors typically comprise a row of insulation displacement contacts mounted in a housing. Each contact has a pair of blades or tines at one end which receive insulated wires and cut into the insulation to establish electrical contact between the wire and the contact. The other end of the contact may also be an insulation displacement contact, or some other contact such as a post for connection no a printed circuit board. In a typical application the insulation displacement contact will be used to connect two wires, one at each end on the contact. In the devices described in U.S. Pat. No. 4,171,857, U.S. Pat. No. 5,044,979, U.S. Pat. No. 5,160,273 and U.S. Pat. No. 5,205,762 a single incoming wire is connected to each of the upper insulation displacement contacts of the first row of contacts and a single outgoing wire is connected to each of the upper insulation displacement contacts of the second row of contacts. The connection between the incoming and outgoing wires comprises the two insulation displacement contacts and the intermediate connector between them. The intermediate connector is formed by the tail ends of the contacts of the first and second rows which are extended in length and bent up in a generally U shape such that the ends of the contacts abut one another to form the intermediate connector.

A further connector of the type described is disclosed in U.S. Pat. No. 5,459,643 assigned to the Siemon Company. In this document. perceived crosstalk problems caused by capacitative imbalance between the rows of contacts are addressed by including in the connector a circuit board which includes a number of carefully spaces plated holes which address the capacitative imbalance.

Banks of break/test connectors of the type described are typically installed in a telephone company's central office and are used to connect incoming subscriber telephone lines to the switching equipment provided to route the calls to other subscribers. There is clearly a limited amount of space available for the line connectors in the building so as the number of subscribers increases so the service provided must either increase the size of the building or fit a connector type which sacrifices the line test facility.

The latter option is unattractive as modem electronic routing circuitry requires over voltage protection to protect, for example, from local lightning strikes. The break-test connector is a very convenient tool for providing this protection which may easily be inserted into the intermediate connector.

One type of well known insulation displacement connector which does not have the break-test facility is the 110 series connector sold by AT&T Corporation. This connector was first described in U.S. Pat. No. 3,798,587 to Ellis and comprises a number of insulation displacement contacts mounted in a plastic housing. The contacts are planar and have pairs of insulation displacement blades at each end. This connector is used very widely throughout the telecommunications wiring industry and has the advantage of requiring less space for each circuit to be connected that the Krone LSA PLUS connectors. However, to provide a break test facility AT&T, in their 110 T series terminal block adopt the same configuration as the Krone LA PLUS break test connector, having two rows of connectors of the type based on that described in Ellis in which the bottoms of the planar contacts are bent to form the intermediate contacts.

Thus, the prior art break-test connectors are bulky and it is desirable to produce a connector that has a break/test facility but which can be arranged in the same density as the connector described in U.S. Pat. No. 3,798,587 Ellis.

Insulation displacement collectors in their various types are often designed for connection to printed circuit boards (PCBs). Typically, one end of the insulation displacement contact terminates in a PCB post or tail which can be passed through a hole as the PCB and soldered in position. This type of connection causes considerable problems when trying to solder IDCs and PCBs using automatic soldering equipment. First, the temperatures developed by the automatic soldering equipment are too hot for the IDC housing which is usually nof a thermoplastic material and will deform. Second, automatic soldering equipment is designed to attach low height conponents such as chips to PCBs and cannot handle IDCs which are relatively tall.

In is desirable, therefore, to provide some means to facilitate the connection of IDCs to PCB using automated technique.

SUMMARY OF THE INVENTION

In is therefore an object of the invention to provide a telecommunications connector which includes a break test facility bun which is more compact than those of the prior art discussed above.

It is a further object of the invention to provide an adaptor for connection of insulation displacement connectors to printed circuit boards (PCBs).

According to the invention there is provided a telecommunications connector comprising:

a housing; and at least one pair of contacts received in the housing, the pair of contacts comprising;

a first contact having an insulation displacement contact portion for receiving and establishing electrical connection with insulated wires, and a spring contact portion having a contact face; and a second contact having a contact portion for establishing electrical connection with a conductor, and a spring contact portion having a contact face; wherein said housing includes:

a first chamber for receiving said insulation displacement contact portion of said first contact and said conductor contact portion of said second contact; and a second chamber for receiving said spring contact portion of said first contact and said spring contact portion of said second contact with said contact faces of said first and second spring contact portions in electrical contact, one of said first and second spring contacts portions being free to move with respect to the other within said second chamber no break said electrical contact therebetween.

The invention also provides a telecommunications connector, comprising:

a housing having a plurality of first chambers and adjacent second chambers;

a plurality of pairs of contacts, each contact of each pair having a portion received in a respective first chamber and a portion received in a respective second chamber, wherein;

the portions of each pair of contacts received in each second chamber include resilient spring contact portions in releasable electrical contact with one another to form a spring contact switch; and the portions of each pair of contacts received in each first chamber are arranged one above the other.

The invention further provides a telecommunications connector, comprising:

a housing having a plurality of first chambers and adjacent second chambers;

a plurality of pairs of contacts, each contact of each pair having a portion received partially in a respective first chamber and a portion received within a respective second chamber, wherein;

the portions of each contact of each pair received in each second chamber include resilient spring contact portions arranged in electrical contact with one another to form spring contact switches; and each contact of each pair includes a means for termination of the contact to a conductor, said termination means being received in said first chambers.

The invention still further provides a telecommunications connector comprising:

a housing having a plurality of first chambers and second chambers; a plurality of pairs of contacts, each pair having a first contact and a second contact, the first contact and a second contact, the first contact of each pair being received partially with a respective second chamber adjacent said first chamber; and the second contact of each pair being received partially in said respective second chamber, and having a further portion outside said second chamber, wherein;

the portions of each pair of contacts received in each second chamber include resilient spring contact portions in releasable electrical contact with one another to form a spring contact switch;

and the portions of the first contacts received in said first chambers and said further portions of said second contacts are arranged one above the other.

Embodiments of the invention have the advantage that they are more compact than prior are break test connectors discussed above. Preferably the break test portions of the contacts are arranged in a chamber of the housing adjacent a chamber which houses the conductor termination portions of the contacts thus avoiding the need for two series of insulation displacement type connectors.

Preferably, the conductor termination portions of the contacts are arranged are above the other in the first chambers. This has the advantage of further reducing the size of the connector.

Preferably the conductor termination portions of the first contact of each pair are V-shaped insulation displacement contacts, each having a pair of blades folded about a slot defined therebetween. The blades of a given contact extend in a direction opposite to that of the adjacent contact which has the advantage of enabling the pitch of the contacts to be minimised. The use of a V-shaped contact allows two wires to be terminated to each contact.

Preferably a series of apertures is provided in a front wall of the housing which defines, in part, the second chambers. A series of tongues is provided behind these apertures, the tongues extend into the second chambers and support one of the contacts. On insertion the tongues are deflected into their associated apertures.

A further aspect of the invention provides an adaptor for connecting an insulation displacement connector to a printed circuit board, said insulation displacement connector comprising a plurality of insulation displacement contacts arranged in a housing, each insulation displacement contact having first and second insulation displacement contact portions at the ends thereof, the adaptor comprising:

a body;

a plurality of contact tails depending from the body and extending therethrough; wherein the base comprises:

means defining a plurality of slots, a contact tail being arranged in each slot for engagement with one of said first and second insulation displacement contacts portions of said insulation displacement contacts; and means for engaging the body with said connector.

An adaptor embodying this aspect of the invention has the advantage of facilitating connection of an insulation displacement connector no a PCB. By using a separate adaptor made from a suitable heat resistant plastic problems with the degradation of insulation displacement connector housings in the heat generated by automatic soldering equipment are avoided. Also the adaptor may have a low profile which is advantageous as insulation displacement connectors are generally too tall for use with automatic soldering equipment.

BRIEF DESCRIPTION OF THE DRAWINGS

Embodiments of the invention will now be described, by way of example only, and with reference to the accompanying drawings in which:

FIG. 5 a is a view on the line Va—Va in FIG. 4;

DESCRIPTION OF PREFERRED EMBODIMENT

Figure 1:
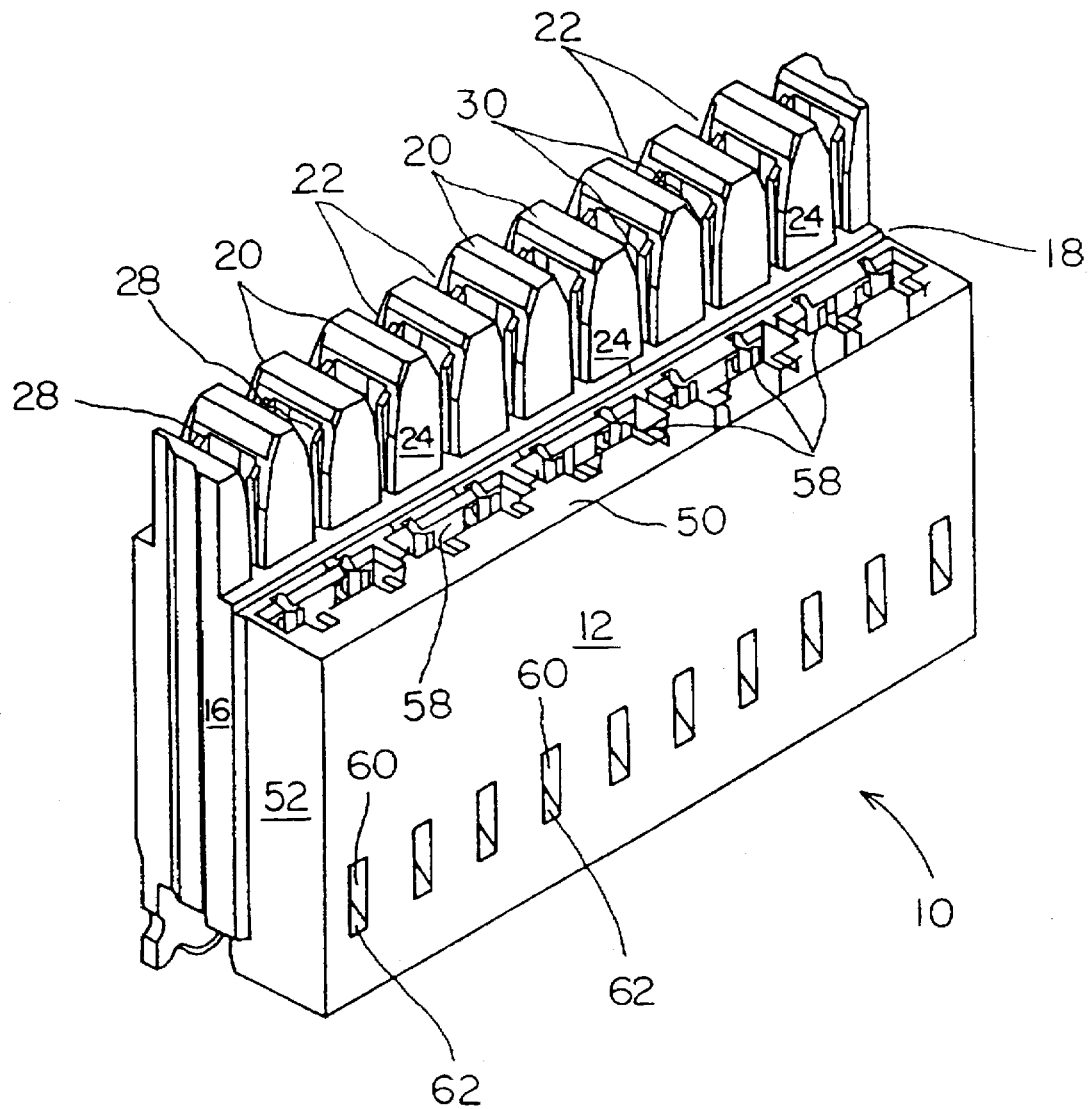
FIG. 1 is a perspective view of a connector housing embodying the invention.
Figure 2:
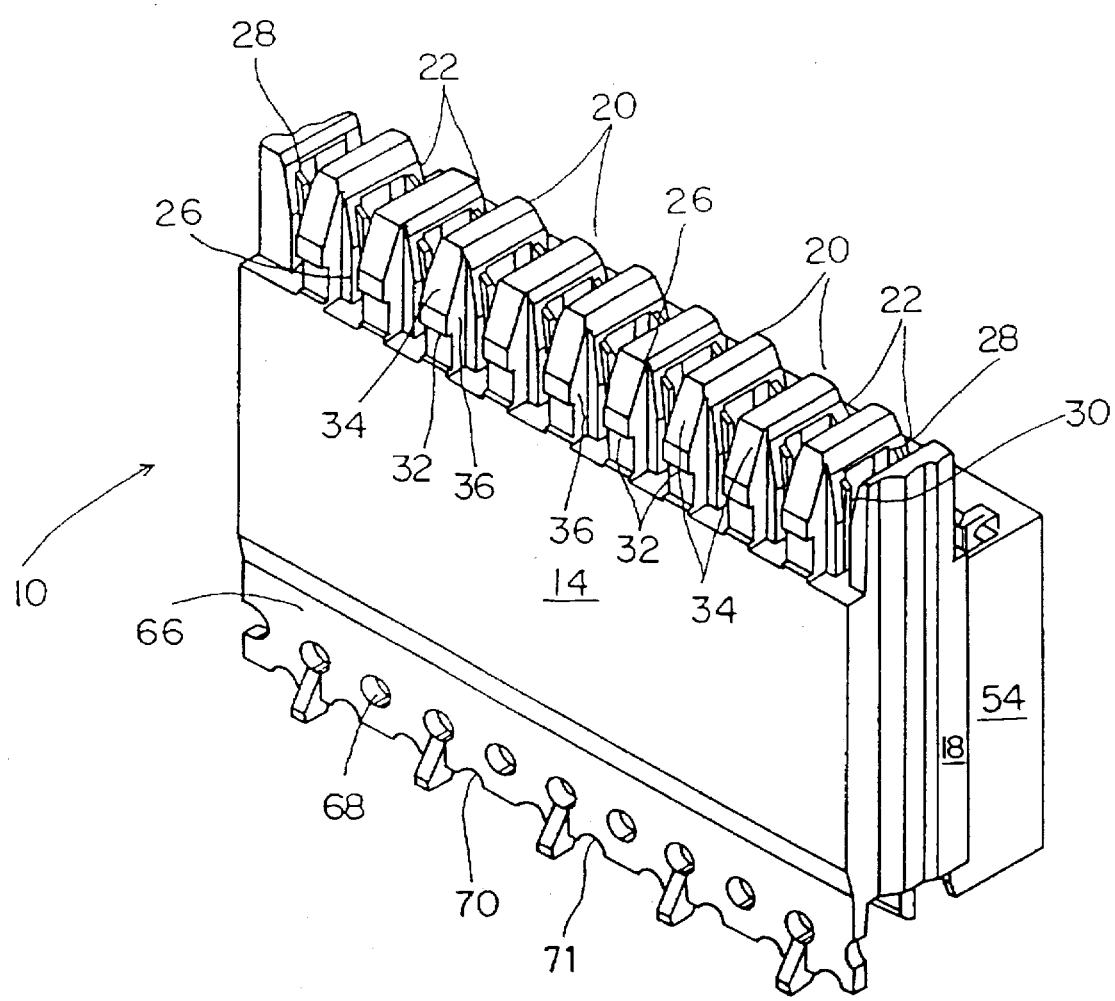
FIG. 2 is a second perspective view of the housing of FIG. 1.
Figure 3:
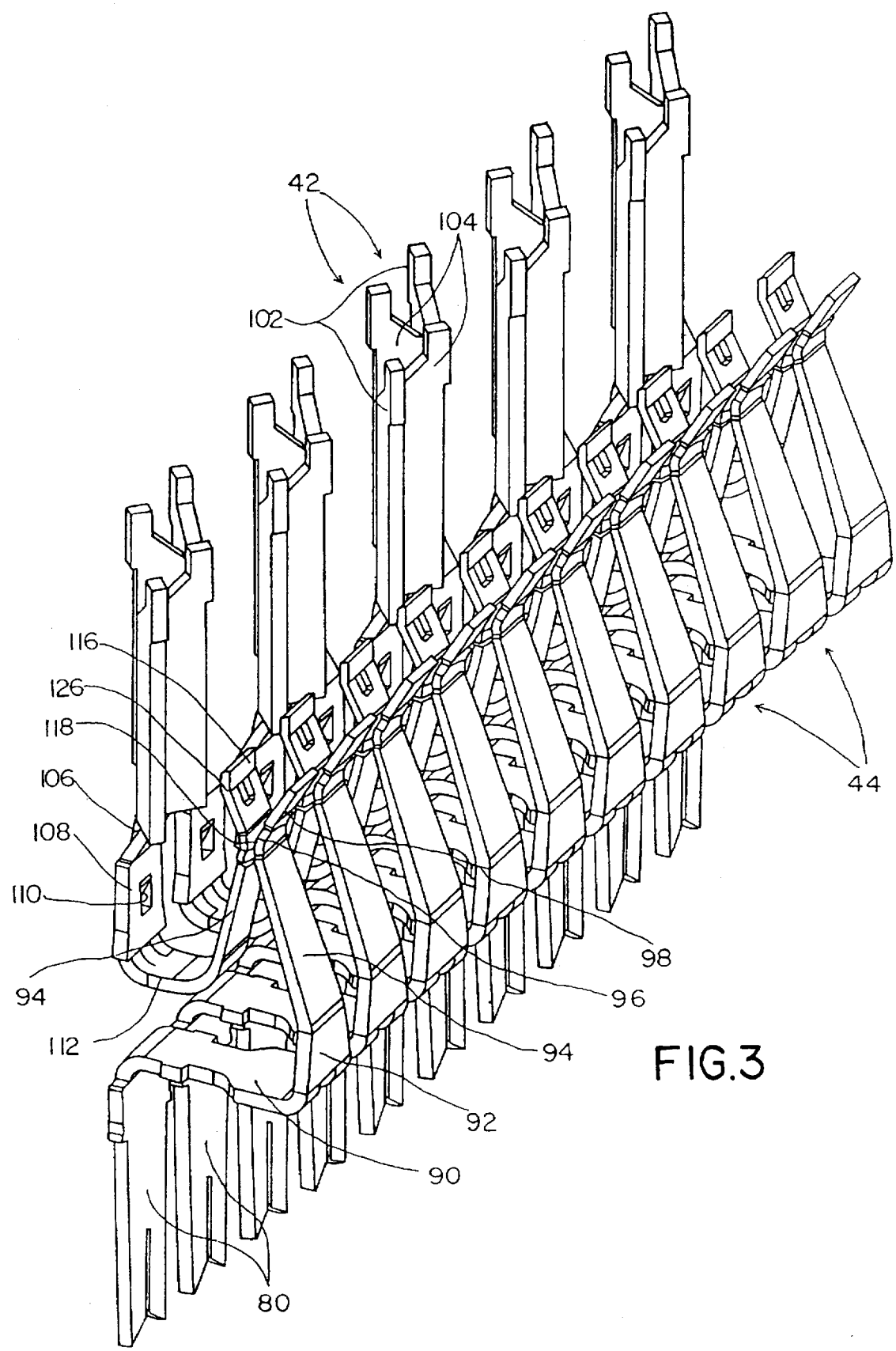
FIG. 3 is a perspective view of the contact assembly retained in the housing of FIGS. 1 and 2.
Figure 4:
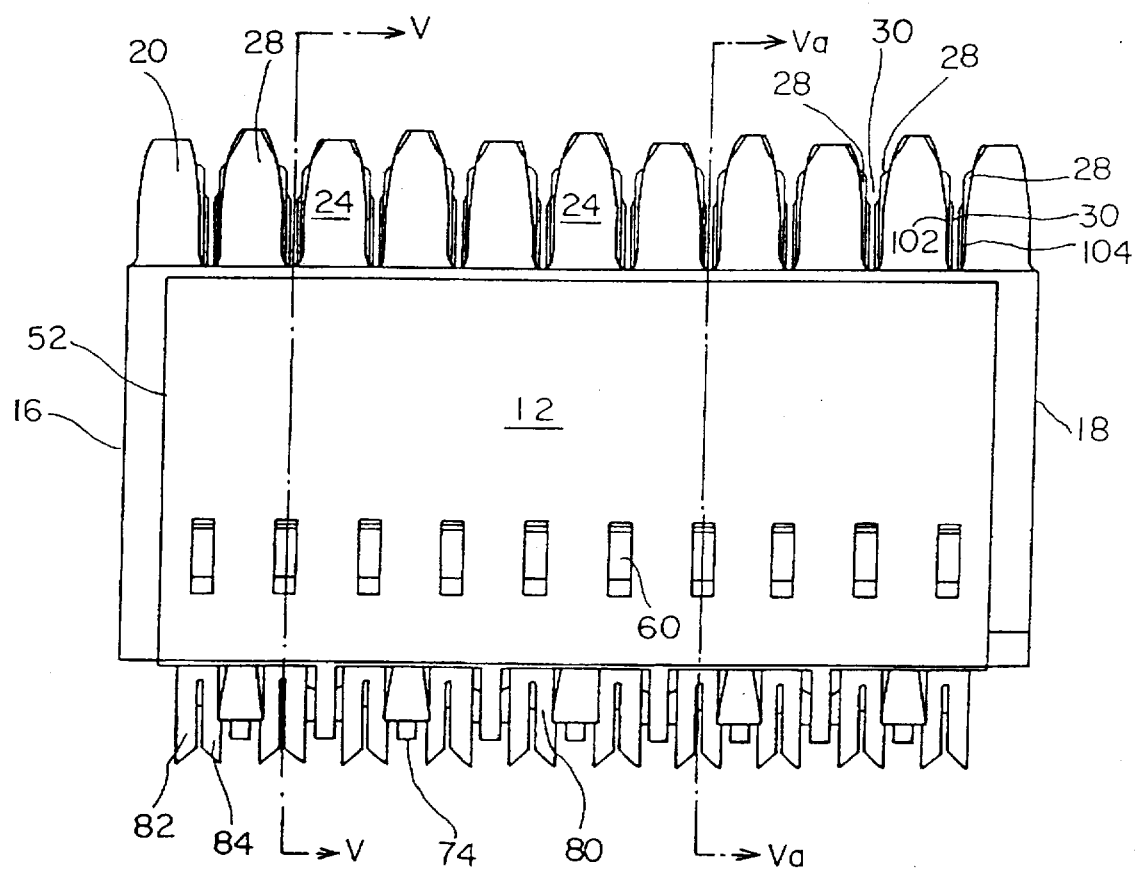
FIG. 4 is a front view of the housing of FIGS. 1 and 2 with the contacts of FIG. 3 in position.

Referring no FIGS. 1 and 2 there is shown a housing 10 for a break/test connector embodying the invention. The housing can receive 10 sets of insulation displacement contacts, each contact comprising a first and a second contact (FIG. 3). The housing is generally rectangular, having a rear wall 12, a front wall 14 and sides 16,18. At the top of the connector, a plurality of teeth 20 are formed, defining a series of ten slots 22, each slot being defined by a pair of adjacent teeth. At the ends of the housing half teeth are formed to define the first and the last teeth. The teeth have front and rear walls 24,26 which taper from bottom to top such that the slots 22 are generally V-shaped having their widest portion at the top of the teeth to facilitate wire insertion into the slots. Each tooth has a pair of ribs 28 on both sides which define a narrow slot 30 therebetween (see FIG. 4). The ribs serve both as a wire guide for insulated wires terminated on contacts retained in the housing and also as a guide for a wire termination tool as is described in our International patent application WO 93/22808. The rear walls 26 of each tooth carry a projection 32 which has a sloping face 34 and side walls 36. The side walls 36 of the projections on adjacent teeth form a channel which, in conjunction with the adjacent edges of the rear walls of the teeth, can also be used to receive a second type of wire termination tool as is also described in WO 93/22808.

Figure 5:
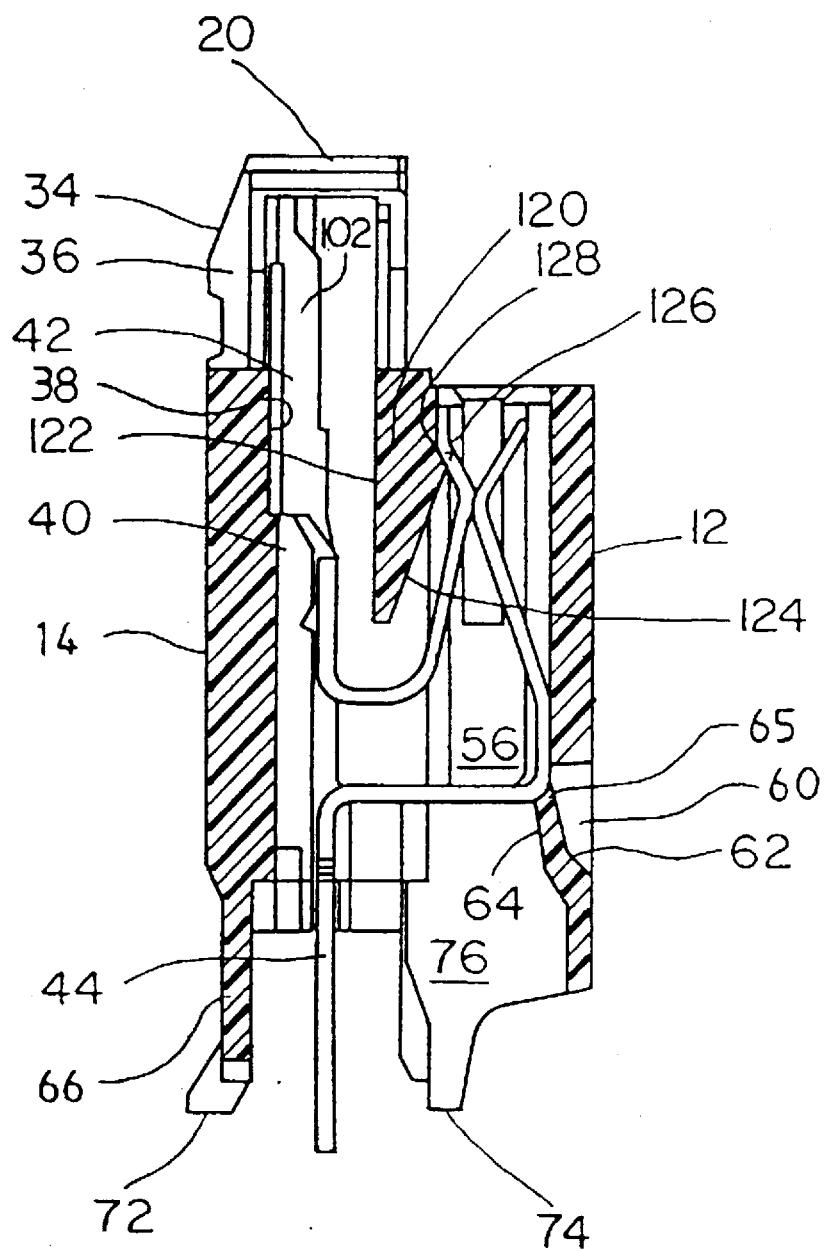
FIG. 5 is a view on the line V—V in FIG. 4 showing the contact arrangement.

Referring also to FIG. 5, the inner walls 38 of the teeth have a rectangular recess 40 in which is received one end of an insulation displacement contact. Within the housing is a series of chambers 40 each of which receives a first part of a first contact 42 and the tail end of a second contact 44. In this embodiment both contact parts are insulation displacement contacts as will be described in greater detail, however other contact types, such as PCB tails may be used where appropriate.

The chambers 40 in which the insulation displacement portions of the contacts 42,44 are located are formed in the rear of the housing in the area bounded by the teeth 20, the rear wall 14 and the rear portions 46,48 of the side walls 16,18. The front wall 12 together with a top surface 50 and front side walls 52,54 define a further series of chambers 56 which are adjacent the first chambers, one of which can be seen in FIG. 5 and which house the remaining portions of the first and second contacts. As can be seen clearly in FIG. 5, the two chambers 40,56 of a given contact pair communicate with one another but are partially separated by a wall 120. Thus, the contacts are each received and retained partially in the first chambers and partially in the second chambers.

Figure 8:
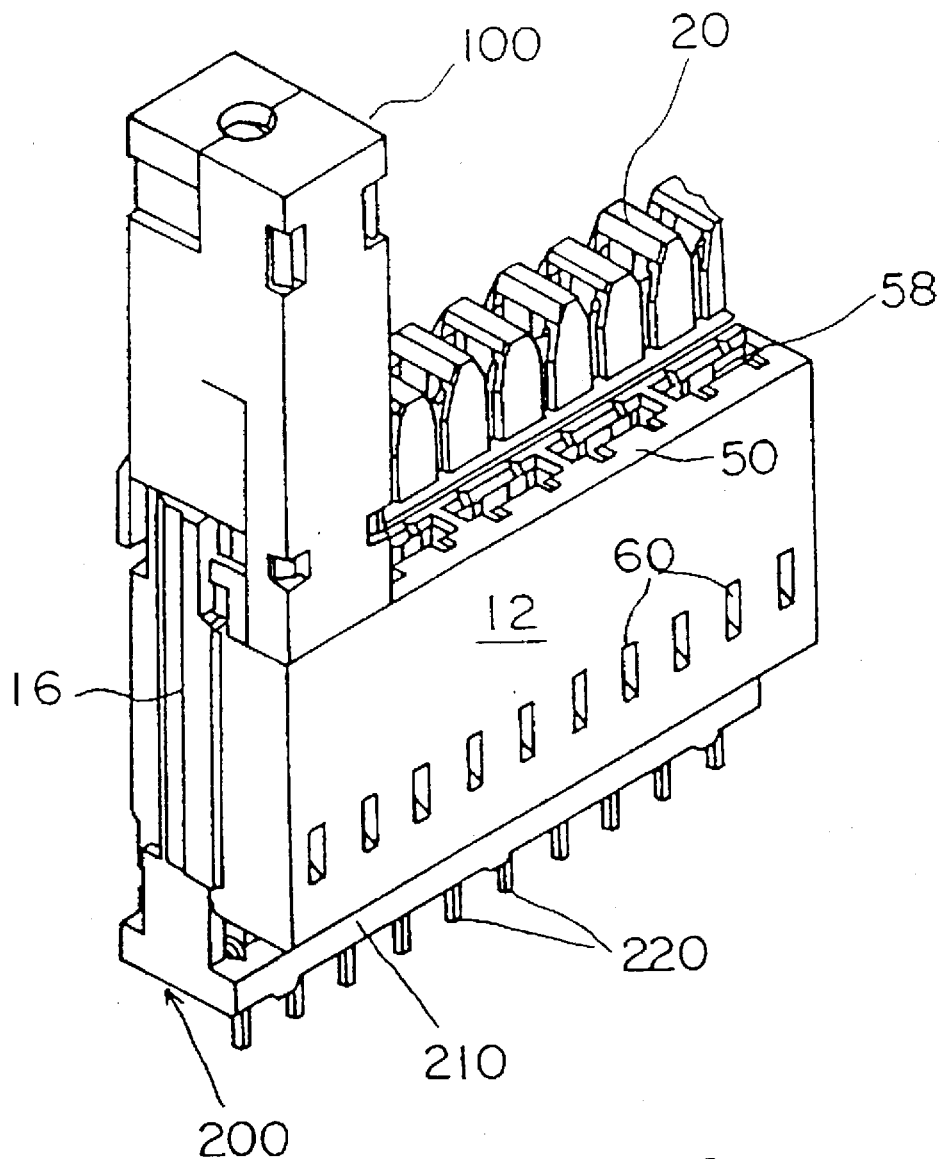
FIG. 8 is a perspective view of an assembled connector with a test plus in position and an adaptor for mounting on a printed circuit board.

The top wall 50 defining the front chambers has a series of five slots 58 each of which allow access to a pair of connector sets. A test connector 100 can be inserted through one of these slots as shown in FIG. 8. The arrangement of the slots ensures that the test connector can only be inserted across an electrical pair of connector sets, that is the first and second, third and fourth, fifth and sixth, seventh and eight or ninth and tenth as opposed to the second and third etc.

The front wall 12 carries a series of rectangular apertures 60 each of which has a sloping bottom surface 62. As can be seen from FIG. 5 a tongue 64 projects inwards into the chamber 56 from this sloped surface 62. The end 66 of the tongue is chamfered and provides support for the second contact 44. The tongue is resilient which enables the second contact to be inserted into the housing from the underside. As the contact is forced in to the housing the tongue will flex into the aperture 60 allowing passage of the widest part of the housing. The tongue will then snap out underneath that widest portion to provide support.

Referring back to FIG. 2, the rear walls of the housing has a dependent flange 66 along its length which is provided with a series of apertures 68 and, along its lowest edge 70, a series of semi-circular recesses 72 which receive wires therminated at the insulation displacement for contact on the second contact 44. A series of lateral feet 72 project away from add below the bottom wall, depending therefrom. These feet in conjunction with feet 74 projecting downwards from the middle of the housing and formed by flanges 76 which separate the front chambers 56 provide a stable base for the connector to prevent it rocking from side to side when mounted on a connector strip or the like.

As shown in FIGS. 1 and 2 the profiles of the rear portions of the two end walls 16,18 are the inverse of each other. This arrangement, described in detail in our International application WO 92/22941, enables connectors to be stacked end to end such that the abutting end walls have a total width equal to that of a single tooth and the pitch of the contacts is not altered. This enables a number of connectors to be mounted on a long index strip.

Referring now to FIGS. 3, 5, 5a, 6 and 7, the first and second contacts of each contact set will now be described. The second contacts 44 are common to all the contacts sets and comprise a planar insulation displacement contact 80 having a pair of contact blades 82,84 defining a slot 86 therebeween at the bottom of the contact 80, that is the end remote from the contact blades. An intermediate portion 88 extends at approximately right angles to the contact portion 80 although this angle is not critical. The contact then turns through a further right angle in the opposite direction to form an upper spring clip portion 90 which comprises four parts: a base portion 92 which extends upwards from the intermediate portion approximately at right angles thereto; a sloped portion 94 which is angled back towards the plane of the insulation displacement portion 80 at an angle of about 25° to the vertical, this angle again not being critical; a contact portion 96 formed at the end of the sloped portion 94 and a short upper end portion 98 which extends out approximately the same angle as the sloped portion but in the opposite sense and, with the sloped portion defines the contact portion 96 as an area across the width of the contact at the transition between the sloped and end portions. The base portion 92 and the sloped portion 94 are tapered, the narrowest point being the contact portion 96.

Figure 5A:
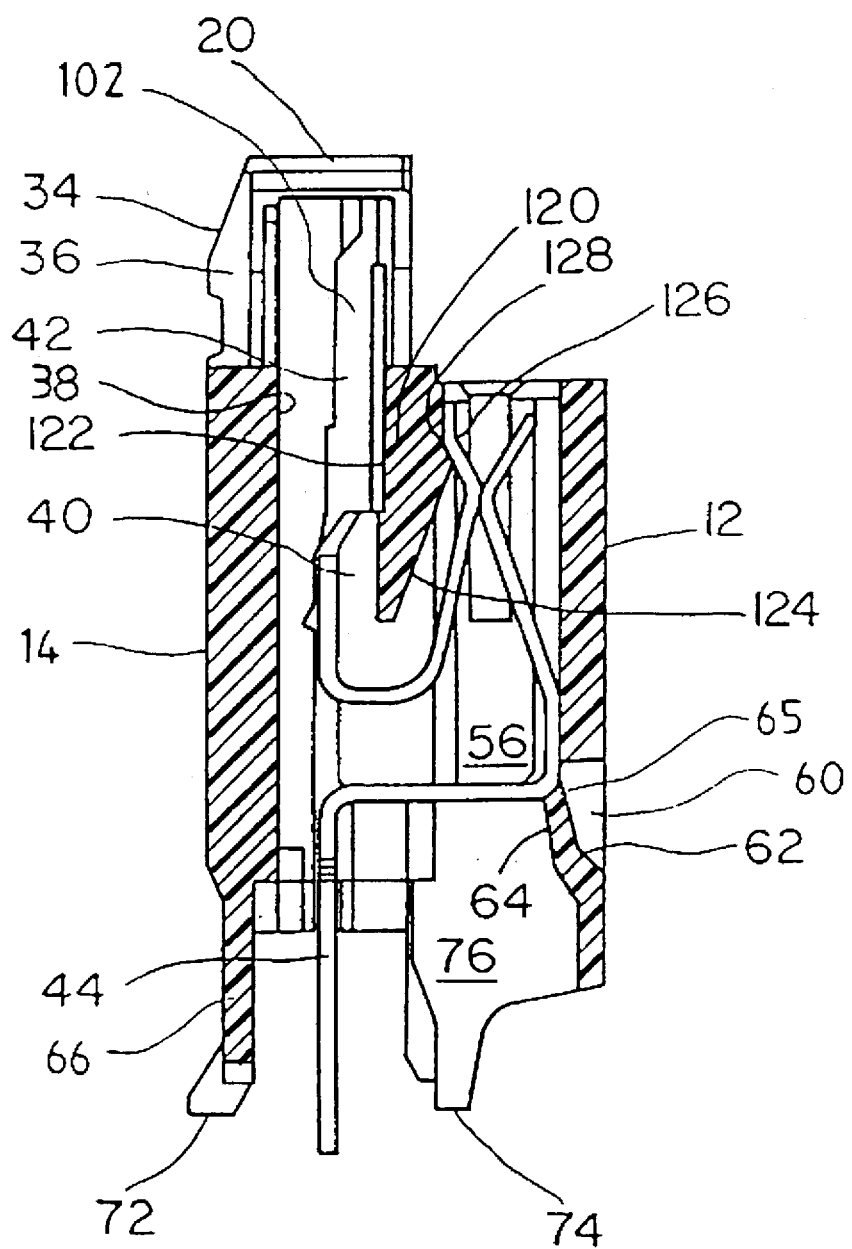
Figure 6A:
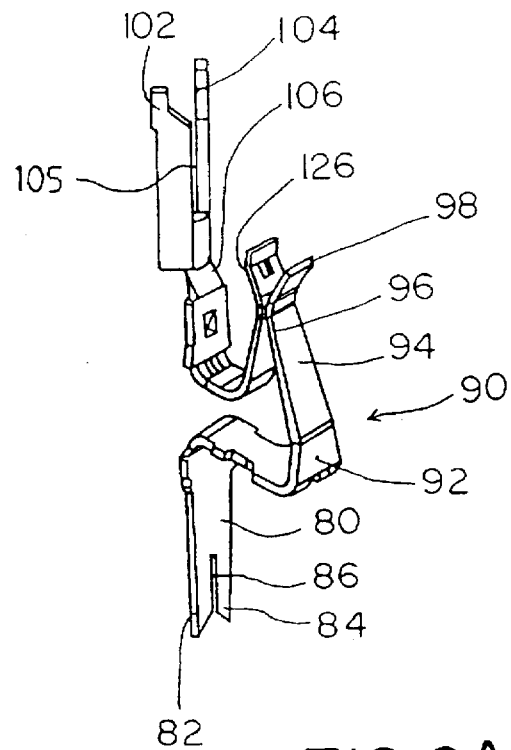
FIG. 6 a is view of a first contact pair.
FIG. 6b is a view of a second contact pair showing the contacts apart for clarity.
Figure 6B:
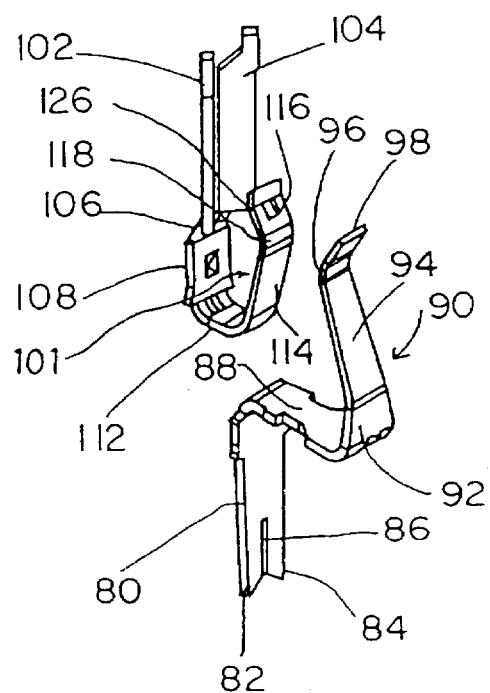
Figure 7A:
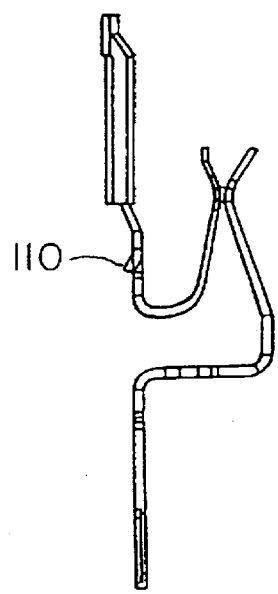
FIGS. 7a and 7b are side views corresponding to FIGS. 6a and b.
Figure 7B:
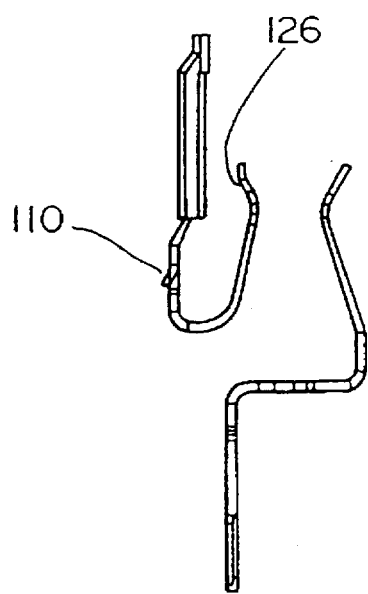

The first contacts alternate between the contact types shown in FIG. 6a and those shown in FIG. 6b. In both cases the contact is of the folded V-type as described in our International application WO 92/22941 the description and drawings of which are incorporated herein by reference. However, in FIG. 6a the blades 102,104 of the contact are folded away from the second contact whereas in FIG. 6b the blades are folded towards the second contact. When in position the blades of the contacts extend alternately on opposite sides of the central axis on which the contacts are arranged which serves to reduce the width of the connector as is described in detail in WO 92/2941. The arrangement can be seen by comparing FIGS. 5 and 5a and in FIG. 3 in which the blades of the first, third, fifth, seventh and ninth first contacts are folded towards the spring clip portions of the second contacts and the blades of the second, fourth, sixth, eight and tenth contacts are folded away from the spring clip portions of the second contacts.

At the base of the blades 102,104 of each first contact portion there is a neck 106 followed by a broader mounting portion 108 which includes a barb 110 (FIG. 7) for retaining the portion in place in the housing; the barb engages a wall of the housing of the first chamber and secures the first contact in the housing. At the base of the mounting portion is a spring clip tail portion comprises an intermediate portion 112 extending away from the body of the contact at right angle, the angle not being critical, a sloped portion 112 extended upwards and away from the insulation displacement contact portion, a short end portion 116 sloping in the opposite direction and having a shoulder 126, and a contact portion 118 formed at the junction of the two sloped portions as an area extending across the width of the contact.

To insert the contacts into their respective chambers in the housing, the first contact portion (with blades facing inwards or outwards according to position) is first inserted from the open bottom of the housing. An the top of the housing, depending from the rear of top wall 50 is a skirt 120 having a rear wall 122 a chamfered front wall 122. The end portion of the spring clip runs along the chamfered front wall against its own resilience until the shoulder 124 in the end portion locates in a correspondingly shaped ledge 126 on the front wall of the skirt 120. At the same time the barb 110 on the mounting portion 108 embeds itself into the plastic wall 128 of the housing. On application of force in a direction opposite to the direction of insertion of the first contact, for example on termination of a wire, the bard will tend no embed itself further into the wall 128 preventing the contact from coming out of position. The first contact is thus held firm in the housing.

The second contact is then inserted. As described, the tongue 64 on the front wall of the housing is pushed into its aperture 62 as the portion 92 of the spring clip passes over it. The tongue then springs out underneath to retain the second contact in position. As can be seen from FIGS. 3 and 5, the contact faces 96,118 of the two spring clip portions are aligned and abut one another to form a switch. It can also be seen that the chamber 56 is dimensioned such that the spring clip portion of the second contact is free to move against its resilience towards the front wall on insertion of a tester or the like through slots 58 in upper wall 50 and between the contact faces 96,118. On removal of the tester the resilience of the second spring clip portion will ensure that contact is restored.

As is clear from FIGS. 5 and 5a the portion of the second contact which carries the wire termination means, in this case an IDC, is arranged below the insulation displacement contact portion of the first contact.

The embodiment of the invention described has the advantage of reducing the amount of space required no provide a break-test facility greatly from the arrangement described in U.S. Pat. No. 4,171,857 and other similar arrangements described earlier. The size of the connector approaches that of Ellis type connector of U.S. Pat. No. 3,795,587 with the advantage of the break test facility.

The connector described is suitable for providing connection between two sets of insulated wires. However, the second contacts need not have insulation displacement contacts at their ends but could terminate, for example, in posts suitable for connection with printed circuit boards. Whilst such an arrangement is electrically satisfactory, it does not lend itself to automated production for two principal reasons. First, the height of the connector is too great for automatic soldering using conventional machines. Second, the temperatures generated by the automatic soldering process is too great for the plastic used to form the housing.

Figure 9:
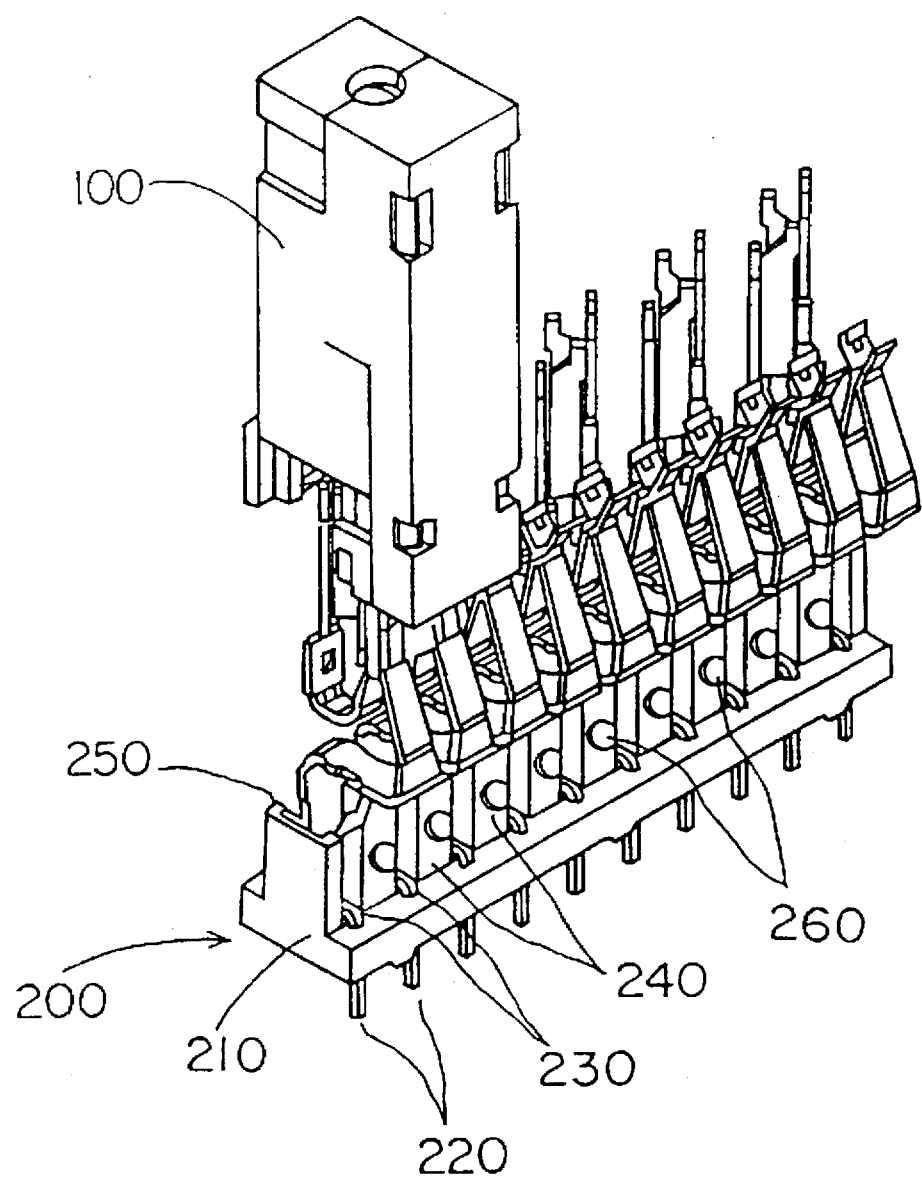
FIG. 9 is a perspective view, similar to FIG. 8, with the housing removed.

FIGS. 8 and 9 show how the embodiment described may be connected without modification to a PCB. A printed circuit board base portion 200 is introduced which comprises a thermoplastic body 210 which is capable of withstanding the temperatures generated by automatic soldering machines, and PCB contact tails 220 which depend from the body 210. The tails extend through apertures in the body and are folded into slots 230 formed between upstanding teeth. The teeth have front and rear walls 240,250 and are hollow so that they can receive the insulation displacement contacts of the second contacts, which receive the PCB contact tails folded into the slots 230 in the slots defined between the blades of the insulation displacement contacts. A series of circular projections 260 is provided on one face of the teeth. When assembled on the housing, the holes 68 on the dependent flange 66 receive these projections so as to engage the PCB base positively on the housing. The projections could be provided on the flange and apertures a recesses at the base.

In use, the PCB is first attached to the PCB avoiding problems Of temperature and size. The break/test housing is then engaged on the base.

It should be understood that the PCB base is an adaptor which facilitates connection of insulation displacement connectors to printed circuit boards especially where it is desired to use automated assembly methods. It is not limited to break/test connectors nor to the particular style of insulation displacememt contact used in the example described. It may, for example be used with other known contact types such as, angled planar contacts, folded V contacts and split cylinder contacts.

The embodiment of FIGS. 8 and 9 is shown, for the purposes of illustration only, with a tester in position. Whilst the tester shown need not be anything other than standard, it may be modified to provide enhanced connector performance to meet TIA/EIA 100 MMz category 5 transmission requirements. The problems with cross-talk discussed in U.S. Pat. No. 5,459,643 may be avoided by including a capacitance within the tester which is then left permanently in position. This avoids the bulky and expensive solution of an additional PCB with plated holes as required by U.S. Pat. No. 5,459,643.

Various other modifications and substitutions may be made to the embodiments described without departing from the spirit and scope of the invention which is defined by the claims as follows:

What is claimed:

1. A telecommunications connector comprising:
    a housing; and
    at least one pair of contacts received in the housing, the pair of contacts comprising;
    a first contact having an insulation displacement contact portion for receiving and establishing electrical connection with insulated wires, and a spring contact portion having a contact face; and
    a second contact having a contact portion for establishing electrical connection with a conductor, and a spring contact portion having a contact face; wherein
    said housing includes:
    a first chamber for receiving said insulation displacement contact portion of said first contact and said conductor contact portion of said second contact; and
    a second chamber for receiving said spring contact portion of said first contact and said spring contact portion of said second contact with said contact faces of said first and second spring contact portions in electrical contact, at least one of said first and second spring contacts portions being free to move with respect to the other within said second chamber to break said electrical contact therebetween.

2. A telecommunications connector according to claim 1, wherein said conductor contact portion of said second contact is an insulation displacement contact portion.

3. A telecommunications connector according to claim 1, wherein said second chamber of said housing is adjacent said first chamber of said housing.

4. A telecommunications connector according to claim 1, wherein said insulation displacement contact portion of said first contact and said conductor contact portion of said second contact are arranged one above the other in said first chamber of said housing.

5. A telecommunications connector according to claim 1, wherein said insulation displacement contact portion of said first contact is a V shaped folded contact having first and second contact blades defining a slot therebetween, the blades being folded about said slot and extending towards said spring contact portion of said first contact.

6. A telecommunications connector according to claim 1, wherein said insulation displacement contact portion of said first contact is a V shaped folded contact having first and second contact blades defining a slot therebetween, the blades being folded about said slot and extending away from said spring contact portion of said first contact.

7. A telecommunications connector according to claim 1, wherein said connector further comprises a plurality of said pairs of contacts, each pair arranged in respective first and second chambers in said housing.

8. A telecommunications connector according to claim 7, wherein said insulation displacement contact portions of said first contacts are V shaped folded contacts each having first and second contact blades defining a slot therebetween, the blades being folded about said slot and extending in a direction towards or away, from the respective spring contact portion the opposite of that of the first contact portion of the adjacent contact pair.

9. A telecommunications connector according to claim 1, wherein said second chamber is defined by a front wall, end walls and a top wall, said top wall including slots therein for introduction of a tester between the contact faces of said first and second contacts.

10. A telecommunications connector according to claim 1, wherein said second chamber is defined by a front wall of said housing having an aperture therein, the housing further comprising a resilient tongue extending into said second chamber and smaller than said aperture, said resilient tongue supporting said second contact in said second chamber.

11. A telecommunications connector according to claim 1, wherein said housing further comprises a flange between said first and said second chambers, said flange having a slope face extending into said second chamber and a shoulder for engaging said second contact.

12. A telecommunications connector according to claim 11, wherein said second chamber is defined by a front wall of said housing having an aperture therein, the housing further comprising a resilient tongue extending into said second chamber and smaller than said aperture, said resilient tongue supporting said second contact in said second chamber.

13. A telecommunications connector according to claim 1, wherein said housing further comprises a plurality of feet extending laterally from the housing and depending therefrom.

14. A telecommunications connector according to claim 1, wherein said first contact further includes a barb for engaging and securing said first contact with a wall of said housing defining said first chamber.

15. A telecommunications connector according to claim 1, wherein said housing further comprises a dependent flange carrying a plurality of apertures.

16. A telescommunications connector according to claim 15 wherein said housing further comprises a plurality of feet extending laterally from the housing and depending therefrom.

17. A telecommunications connector according to claim 1, wherein said connector further comprises a printed circuit board (PCB) adaptor having a base and at least one wire tail for receipt on the PCB, the tail being arranged on said base for contact with said conductor contact portion of said second contact and said housing and said body having means for engaging said housing positively on said body.

18. A telecommunications connector according to claim 17, wherein said engaging means comprises at least one projection on one of said body and said housing and at least one aperture to receive said housing on the other of said body and said housing.

19. A telecommunications connector according to claim 18, wherein said aperture is provided on a flange depending from said housing.

20. A telecommunications connector, comprising:
a housing having a plurality of first chambers and adjacent second chambers;
a plurality of pairs of contacts, each contact of each pair having a portion received in a respective first chamber of said housing and a portion received in a respective second chamber of said housing, wherein;
the portions of each pair of contacts received in each second chamber include resilient spring contact portions in releasable electrical contact with one another to form a spring contact switch; and
the portions of each pair of contacts received in each first chamber are arranged one above the other.

21. A telecommunications connector according to claim 20, wherein the portions of first contacts of said contact pairs received in said first chamber comprise insulation displacement contacts.

22. A telecommunications connector according to claim 20, wherein the portions of second contacts of each contact pair received in said first chamber comprise insulation displacement contacts.

23. A telecommunications connector, according to claim 21, wherein said insulation displacement contacts are V shaped contacts having a pair of contacts folded about a slot defined therebetween.

24. A telecommunications connector according to claim 23, wherein the blades of a given first contact portion extend in a direction towards or away from said second chambers opposite to that of the blades of a first contact portion of an adjacent first contact.

25. A telecommunications connector according to claim 20, wherein one of the spring contact portions of each pair is free to move within a respective said second chamber.

26. A telecommunications connector according to claim 20, wherein said housing comprises a front wall, side walls and a top wall, said front, side and top walls defining said second chambers, said top walls including a plurality of slots permitting access to the spring contact switches in said second chambers.

27. A telecommunications connector according to claim 20, wherein said second chambers are defined, in part, by a front wall of said housing having a plurality of apertures therein, the housing further comprising a plurality of resilient tongues each arranged behind each aperture no extend into each second chamber and being smaller than the apertures, the resilient tongues supporting one of each pair of contacts in the housing.

28. A telecommunications connector according to claim 20, wherein the housing includes a wall partially separating said plurality of first and second chambers, said wall having a sloping face on a side adjacent said second chambers and a solder for retaining one of each pair of contacts in the second chambers.

29. A telecommunications connector according to claim 20, wherein said housing further comprises a plurality of feet depending from and extending laterally of said housing.

30. A telecommunications connector according to claim 20, wherein one of said contacts of each pair includes a barb arranged to engage and secure the contact with a wall of said housing defining said first chambers.

31. A telecommunications connector comprising:

a housing having a plurality of first chambers and adjacent second chambers;

a plurality of pairs of contacts, each contact of each pair having a portion received in a respective first chamber and a portion received wherein a respective second chamber, within;

the portions of each contact of each pair received in each second chamber include resilient spring contact portions arranged in electrical contact with one another to form spring contact switches; and the portions of each contact of each pair received in each first chamber include a means for termination of the contact to a conductor.

* * * * *